(12) United States Patent
Koyanagi et al.

(10) Patent No.: US 11,445,079 B2
(45) Date of Patent: Sep. 13, 2022

(54) IMAGE READING APPARATUS USING PLURALITY OF MEDIA HAVING DIFFERENT LENGTH

(71) Applicant: SEIKO EPSON CORPORATION, Tokyo (JP)

(72) Inventors: Noriyuki Koyanagi, Kitakyushu (JP); Kosuke Nomoto, Shiojiri (JP); Akira Anami, Matsumoto (JP); Naoki Sakamoto, Kitakyushu (JP); Wataru Beppu, Kitakyushu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/470,093

(22) Filed: Sep. 9, 2021

(65) Prior Publication Data

US 2022/0086294 A1 Mar. 17, 2022

(30) Foreign Application Priority Data

Sep. 16, 2020 (JP) .............................. JP2020-155382

(51) Int. Cl.
*G06F 3/12* (2006.01)
*H04N 1/00* (2006.01)
*H04N 1/047* (2006.01)

(52) U.S. Cl.
CPC ......... *H04N 1/00631* (2013.01); *H04N 1/047* (2013.01)

(58) Field of Classification Search
CPC .......................... H04N 1/00631; H04N 1/047

USPC ................................................. 358/1.1–1.18
See application file for complete search history.

(56) References Cited

U.S. PATENT DOCUMENTS

| 2011/0176159 | A1* | 7/2011 | Ohshima | ............ | G03G 15/5029 358/1.14 |
| 2013/0094032 | A1* | 4/2013 | Hunt | ........................ | B41J 29/46 358/1.6 |
| 2014/0138898 | A1 | 5/2014 | Maeda et al. | | |
| 2015/0367779 | A1* | 12/2015 | Ohdachi | ............... | G08G 1/0962 340/905 |
| 2016/0251192 | A1* | 9/2016 | Ogasawara | .......... | G06K 15/403 270/1.01 |
| 2017/0107070 | A1* | 4/2017 | Franke | ................... | B65H 20/02 |

FOREIGN PATENT DOCUMENTS

JP 2014103560 A 6/2014

* cited by examiner

*Primary Examiner* — Gabriel I Garcia
(74) *Attorney, Agent, or Firm* — Chip Law Group

(57) ABSTRACT

When a transport section transports be a media, a controller of an image reading apparatus determines the lengths of the media in the transport direction, based on detection results of a medium detector. When determining that a length of a medium is equal to or more than a threshold and then determining that a length of a subsequent medium is equal to or more than the threshold, the controller decreases an ejection speed of the subsequent medium to a second speed by the transport section. When determining that a length of a medium is equal to or more than the threshold and then determining that a length of a subsequent medium is less than the threshold, the controller decreases the ejection speed from the first speed to a third speed that is lower than the second speed by the transport section.

10 Claims, 10 Drawing Sheets

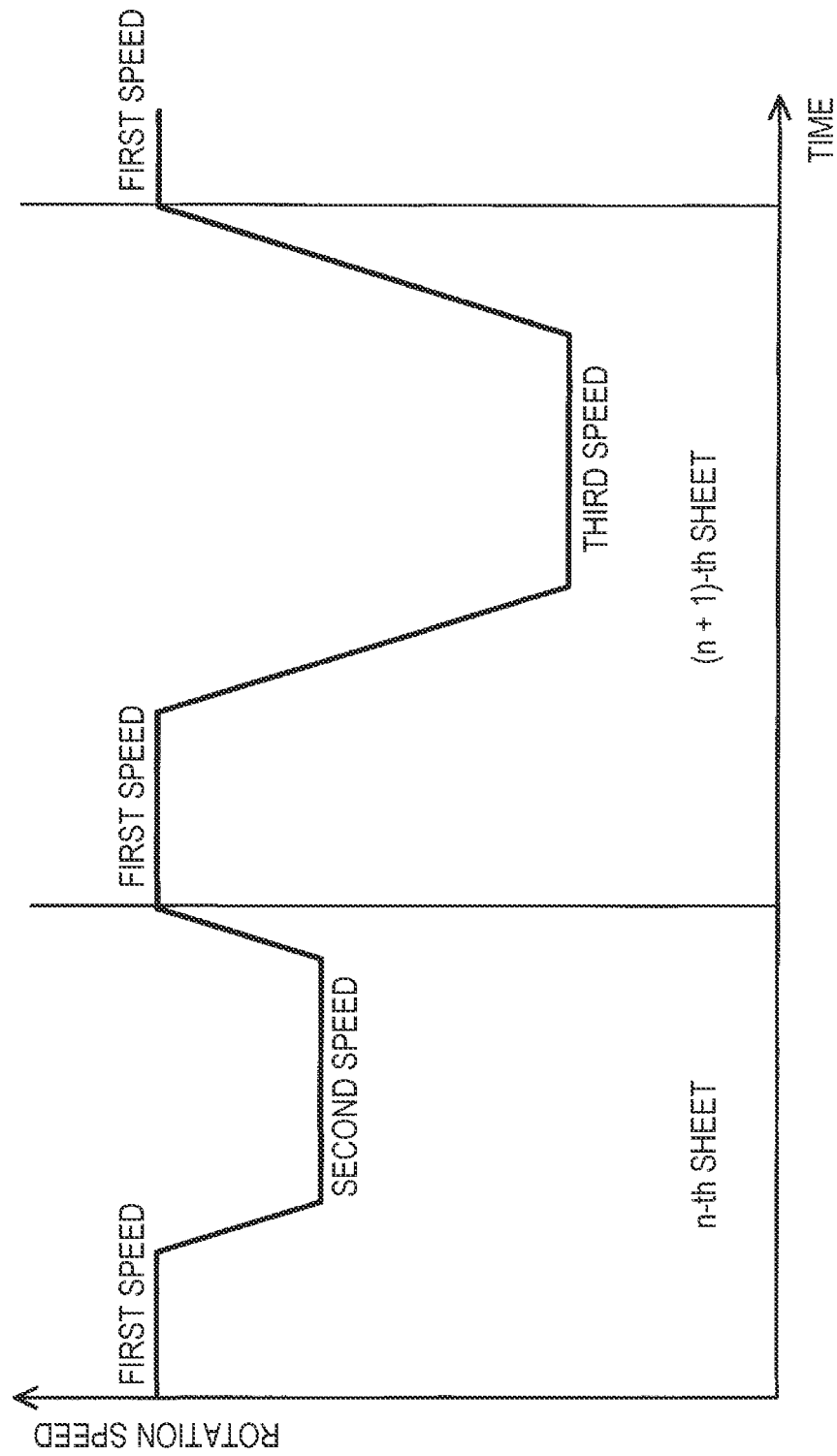

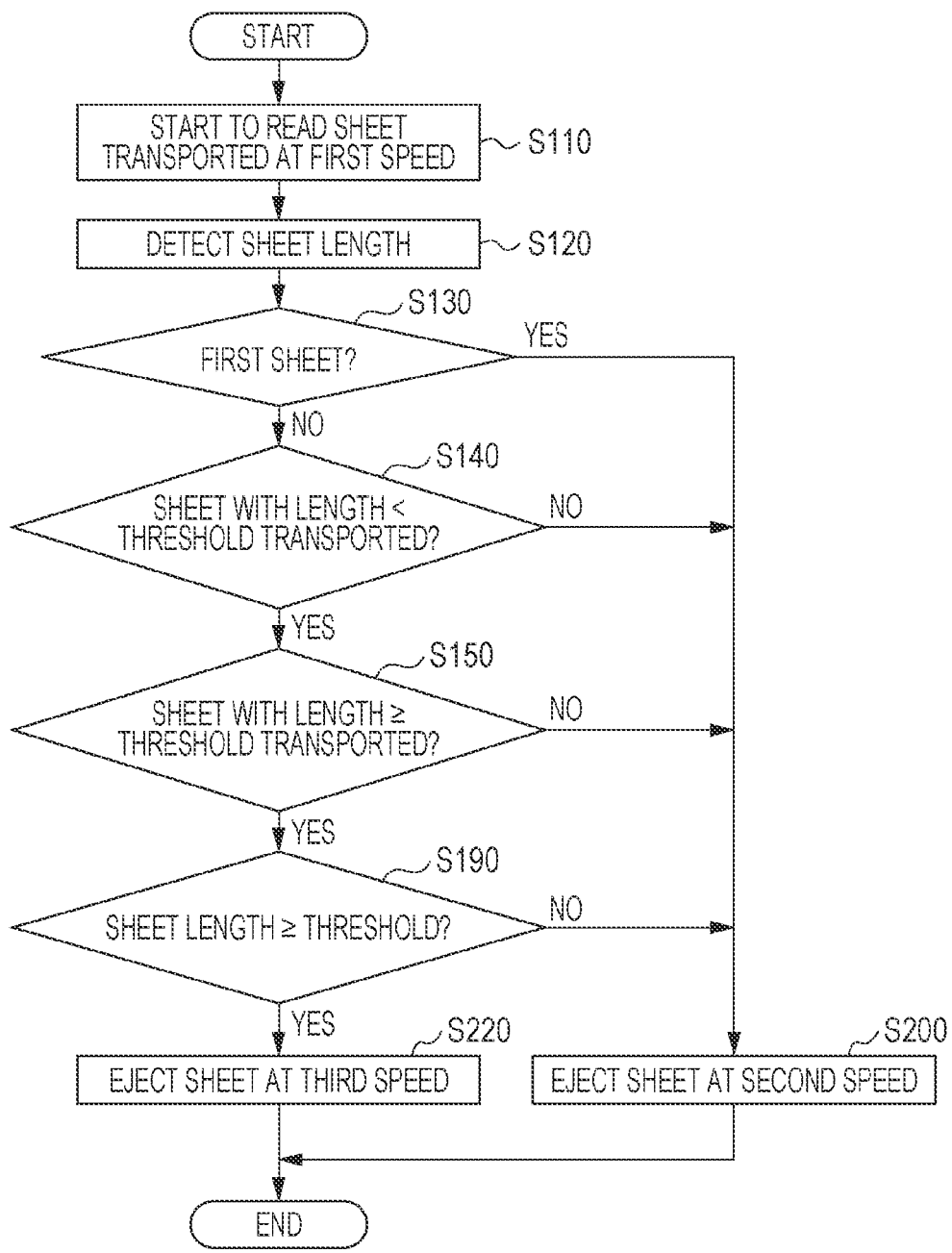

IMAGE READING APPARATUS USING PLURALITY OF MEDIA HAVING DIFFERENT LENGTH

The present application is based on, and claims priority from JP Application Serial Number 2020-155382, filed Sep. 16, 2020, the disclosure of which is hereby incorporated by reference herein in its entirety.

BACKGROUND

1. Technical Field

The present disclosure relates to image reading apparatuses.

2. Related Art

Various types of image reading apparatuses are now available. Some of them have an ejection stacker on which media that have been ejected by an ejection section are stacked. For example, JP-A-2014-103560 discloses an image reading apparatus in which a first transport roller and a second transport roller that constitute an ejection section eject media to an ejection tray and stack them thereon. This image reading apparatus is configured to change the transport speed of the media in accordance with their lengths.

Image reading apparatuses, as disclosed above, have difficulty stacking a plurality of media in an orderly fashion on the ejection stacker if the media have different lengths. Whereas such image reading apparatuses change the transport speed of media being read in accordance with their lengths, they may stack the media randomly on the ejection tray unless the ejection speed of the media is set to be lower than the transport speed.

SUMMARY

The present disclosure is an image reading apparatus configured to sequentially read images from a plurality of media having different lengths in a transport direction. This image reading apparatus includes: a transport section that transports the media at a first speed along a transport route, the transport section being driven by a driver; a reader that reads the images from the media being transported at the first speed along the transport route; an ejection section that ejects the media from which the images were read by the reader to an ejection stacker, the ejection section being driven by the driver; a medium detector that detects presence of the media; and a controller that controls the driver. When the transport section sequentially transports the media, the controller determines the lengths of the media in the transport direction, based on detection results of the medium detector. When determining that a length of a medium is equal to or more than a threshold and then determining that a length of a subsequent medium is equal to or more than the threshold, the controller performs weak deceleration control under which the transport section changes an ejection speed at which the subsequent medium is ejected to the ejection stacker from the first speed to a second speed, the second speed being lower than the first speed. When determining that a length of a medium is equal to or more than the threshold and then determining that a length of a subsequent medium is less than the threshold, the controller performs strong deceleration control under which the transport section changes the ejection speed at which the subsequent medium is ejected to the ejection stacker from the first speed to a third speed, the third speed being lower than the second speed.

BRIEF DESCRIPTION OF THE DRAWINGS

FIG. 9 is a graph showing a varying rotation speed of the transport driving roller and the ejection driving roller with time.

FIG. 10 is a flowchart of an example of a process in which a scanner different from that in FIG. 8 ejects media.

DESCRIPTION OF EXEMPLARY EMBODIMENTS

Figure 1:
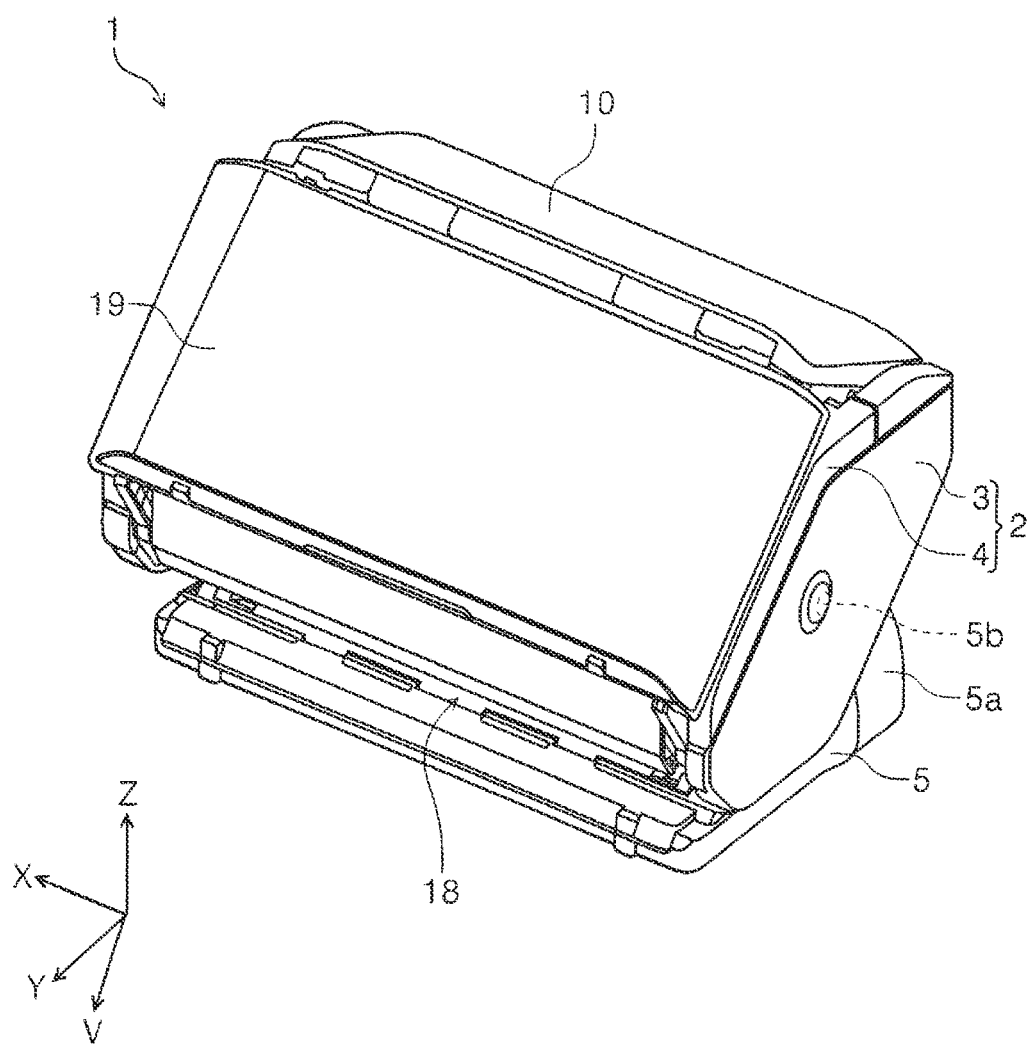
FIG. 1 is a front perspective view of a scanner according to an embodiment of the present disclosure.

Some aspects of the present disclosure will be described below.

According to a first aspect of the present disclosure, an image reading apparatus is configured to sequentially read images from a plurality of media having different lengths in a transport direction. This image reading apparatus includes: a transport section that transports the media at a first speed along a transport route, the transport section being driven by a driver; a reader that reads the images from the media being transported at the first speed along the transport route; an ejection section that ejects the media from which the images were read by the reader to an ejection stacker, the ejection section being driven by the driver; a medium detector that detects presence of the media; and a controller that controls the driver. When the transport section sequentially transports the media, the controller determines the lengths of the media in the transport direction, based on detection results of the medium detector. When determining that a length of a medium is equal to or more than a threshold and then determining that a length of a subsequent medium is equal to or more than the threshold, the controller performs weak deceleration control under which the transport section changes an ejection speed at which the subsequent medium is ejected to the ejection stacker from the first speed to a second speed, the second speed being lower than the first speed. When determining that a length of a medium is equal to or more than the threshold and then determining that a length of a subsequent medium is less than the threshold, the controller performs strong deceleration control under which the transport section changes the ejection speed at which the subsequent medium is ejected to the ejection stacker from the first speed to a third speed, the third speed being lower than the second speed.

In an image reading apparatus according to the first aspect, when a controller detects a medium the length of which is equal to or more than a threshold based on a detection result of a medium detector during transporting of media by a transport section, the ejection section ejects the remaining media to an ejection stacker at a second speed until the controller detects a medium the length of which is less than the threshold, the second speed being lower than a first speed at which the images are read from the media. Then, when the controller detects a medium the length of which is less than the threshold after having detected a medium the length of which is equal to or more than the threshold, the ejection section ejects the remaining media to the ejection stacker at the third speed, the third speed being lower than the second speed. This image reading apparatus is configured to eject media at a speed lower than a transport speed of the media from which images are being read. After having ejected a long medium and then a short medium, the image reading apparatus ejects the remaining media at a greatly decreased speed. As the image reading apparatus ejects media at a lower speed, it takes a longer time to read images from all the media, but the media are more likely to be stacked in an orderly fashion on the ejection stacker. In general, when a typical image reading apparatus ejects a long medium and a short medium in this order, the media may be stacked randomly on the ejection stacker. This is because a typical image reading apparatus tends to avoid ejecting media at a low speed in order to read images from the media in a short time. Moreover, when a typical image reading apparatus ejects a long medium, which tends to be stacked in an orderly fashion, and a short medium in this order at the same speed, only the short media may be stacked randomly. In this aspect, however, the image reading apparatus ejects media having different lengths at a greatly decreased speed as necessary, thereby suppressing the media from being stacked randomly. In this way, the image reading apparatus successfully stacks a plurality of media having different lengths in an orderly fashion on the ejection stacker.

According to a second aspect of the present disclosure, the image reading apparatus may have, in addition to the configuration of the first aspect, a configuration in which the threshold is set to a distance, in an ejection direction, between a point at which the ejection section ejects the media and a point at which the media make contact with the ejection stacker upon ejection.

In an image reading apparatus according to the second aspect, the threshold is set to a distance, in an ejection direction, between a point at which the ejection section ejects the media and a point at which the media make contact with the ejection stacker upon ejection. For example, if the ejection section ejects a hard medium the length of which exceeds the above distance in the ejection direction, this medium may jam between the ejection section and the ejection stacker, thus causing an ejection failure. This ejection failure is more likely to occur as the ejection speed decreases. In this aspect, however, the image reading apparatus reduces the risk of media being ejected under the condition in which this ejection failure is likely to occur. On the other hand, if media do not make contact with the ejection stacker upon the ejection, they may be stacked randomly on the ejection stacker. However, this image reading apparatus brings portions of media into contact with the ejection stacker upon the ejection, thereby generating braking force between these portions and the ejection stacker, which is effective in suppressing the media from being stacked randomly.

According to a third aspect of the present disclosure, the image reading apparatus may have, in addition to the configuration of the first or second aspect, the following configuration: the image reading apparatus supports a low-speed transport mode in which the transport section transports the media at a fourth speed, the fourth speed being lower than the first speed, and in which the reader reads the images from the media being transported at the fourth speed along the transport route; and when the low-speed transport mode is selected, the controller controls the driver in such a way that the ejection section ejects the media to the ejection stacker at the fourth speed.

In an image reading apparatus according to the third aspect, when a low-speed transport mode is selected, the ejection section ejects the media to the ejection stacker at a fourth speed, which is lower than the first speed. In this way, the image reading apparatus reduces the risk of the media being stacked randomly on the ejection stacker.

According to a fourth aspect of the present disclosure, the image reading apparatus may have, in addition to the configuration of one of the first to third aspects, a configuration in which, when the transport section sequentially transports a series of media, once the controller employs the strong deceleration control, the controller continues to perform the strong deceleration control on the media.

In an image reading apparatus according to the fourth aspect, when the transport section sequentially transports a series of media, the controller continues to perform the strong deceleration control on the media once employing the strong deceleration control. Performing the ejection process in this manner enables the controller to perform simple control at a light load.

According to a fifth aspect of the present disclosure, the image reading apparatus may have, in addition to the configuration of one of the first to third aspects, the following configuration: when the transport section sequentially transports a series of media, once the controller employs the strong deceleration control, the controller determines whether individual lengths of the media in the transport direction are equal to or more than the threshold. Then, when a length of a medium in the transport direction is equal to or more than the threshold, the controller performs the weak deceleration control on the medium, whereas when the length of the medium in the transport direction is less than the threshold, the controller performs the strong deceleration control on the medium.

In an image reading apparatus according to the fifth aspect, when the transport section sequentially transports a series of media, once the controller employs the strong deceleration control, the controller determines whether individual lengths of the media in the transport direction are equal to or more than the threshold. Then, when a length of a medium in the transport direction is equal to or more than the threshold, the controller performs the weak deceleration control on the medium, whereas when the length of the medium in the transport direction is less than the threshold, the controller performs the strong deceleration control on the medium. In this way, the image reading apparatus performs the strong deceleration control only on media the length of which is less than the threshold, namely, only on media that are likely to be stacked randomly. This successfully suppresses the ejection section from ejecting media at a decreased speed, namely, the reader from reading media in an increased time.

According to a sixth aspect of the present disclosure, the image reading apparatus may have, in addition to the configuration of the fourth or fifth aspect, a configuration in which, when the transport section subsequently transports a series of media and then further subsequently transports another series of media, the controller determines whether to switch between the weak deceleration control and the strong deceleration control every time each of the series of media is transported.

In an image reading apparatus according to the sixth aspect, when the transport section subsequently transports a series of media and then further subsequently transports another series of media, the controller determines whether to switch between the weak deceleration control and the strong deceleration control every time each of the series of media is transported. In short, when performing a plurality of jobs, the controller resets the strong deceleration control for each job. In this way, the image reading apparatus successfully selects transport speeds of media so as to be suitable for each job.

According to a seventh aspect of the present disclosure, the image reading apparatus may have, in addition to the configuration of one of the first to sixth aspects, a configuration in which the transport section is configured to transport a plurality of transparent cases containing the respective media and in which the medium detector is a transparent-case detector that detects the lengths of the media in the transport direction, based on locations of the transparent cases transported.

In an image reading apparatus according to the seventh aspect, the image reading apparatus transports transparent cases containing respective media. In this way, the image reading apparatus can easily transport media that would be difficult to transport and, even in this case, can accurately detect the lengths of the media.

According to an eighth aspect of the present disclosure, the image reading apparatus may have, in addition to the configuration of one of the first to seventh aspects, a configuration in which the medium detector is a medium-edge detector that detects locations of edges, in the transport direction, of the media transported along the transport route.

In an image reading apparatus according to the eighth aspect, a medium-edge detector is provided to detect edges of media in the transport direction. In this way, the image reading apparatus can measure lengths of media by detecting edges of each medium in the transport direction.

According to a ninth aspect of the present disclosure, the image reading apparatus may have, in addition to the configuration of one of the first to eighth aspects, a configuration in which the lengths of media in the transport direction are determined in consideration of a fact that the lengths of media increase when the media are diagonally transported.

In an image reading apparatus according to the ninth aspect, the lengths of media in the transport direction are determined in consideration of a fact that the lengths of media increase when the media are diagonally transported. Consequently, even when diagonally transporting media, the image reading apparatus suppresses one of the media from riding on another, thereby successfully reducing the risk of failures to transport the media and to read images from the media.

According to a tenth aspect of the present disclosure, the image reading apparatus may have, in addition to the configuration of one of the first to ninth aspects, the following configuration: the image reading apparatus further includes a feeder that feeds the media along the transport route; and the controller controls the feeder in such a way that, after the ejection section ejects a medium from which an image was read by the reader to the ejection stacker, a next medium reaches a reading site of the reader.

In an image reading apparatus according to the tenth aspect, after the ejection section has ejected a medium from which an image has been read by the reader to the ejection stacker, a next medium reaches a reading site of the reader. This image reading apparatus suppresses one of the media from riding on another, thereby successfully reducing the risk of failures to transport the media and to read images from the media.

Some embodiments of the present disclosure will be described below with reference to the accompanying drawings. In the following description, a scanner 1 is an example of an image reading apparatus of the present disclosure. The scanner 1 is configured to read one surface or both the surfaces of original sheets M, which are an example of media. Herein, the scanner 1 may be a document scanner in which the reader reads the original sheets M being transported relative to the reader.

Each individual drawing employs an X-Y-Z coordinate system: the X-axis is along the width of the scanner 1 or the original sheets M; the Y-axis is along the depth of the scanner 1; and the Z-axis is along the height of the scanner 1. In the X-Y-Z coordinate system, a V-axis is parallel to a sheet transport route T in the scanner 1 along which the original sheets M are to be transported. The angles between the V-axis and the Y-axis and between the V-axis and the Z-axis depend on the attitude of the scanner 1, as will be described later. The +V direction coincides with the transport direction of the original sheets M and also substantially coincides with the ejection direction of the original sheets M. In this embodiment, the direction from the rear to front of the scanner 1 is defined as the +Y direction, whereas the opposite direction is defined as the −Y direction. The left direction as viewed from the front of the scanner 1 is defined as the +X direction, whereas the right direction is defined as the −X direction. In addition, the +V direction is sometimes referred to as the downstream direction, whereas the −V direction is sometimes referred to as the upstream direction.

With reference to FIGS. 1 to 4, the scanner 1 will be described briefly. The scanner 1 includes: a main body 2; and a support stand 5 that rotatably supports the main body 2. The main body 2 includes a lower unit 3 and an upper unit 4. As illustrated in FIG. 4, the upper unit 4 is rotatable around a rotation shaft 30 relative to the lower unit 3 so that the upper unit 4 is openable and closable. When the upper unit 4 is rotated and opened, the sheet transport route T becomes exposed to the outside.

Figure 4A:
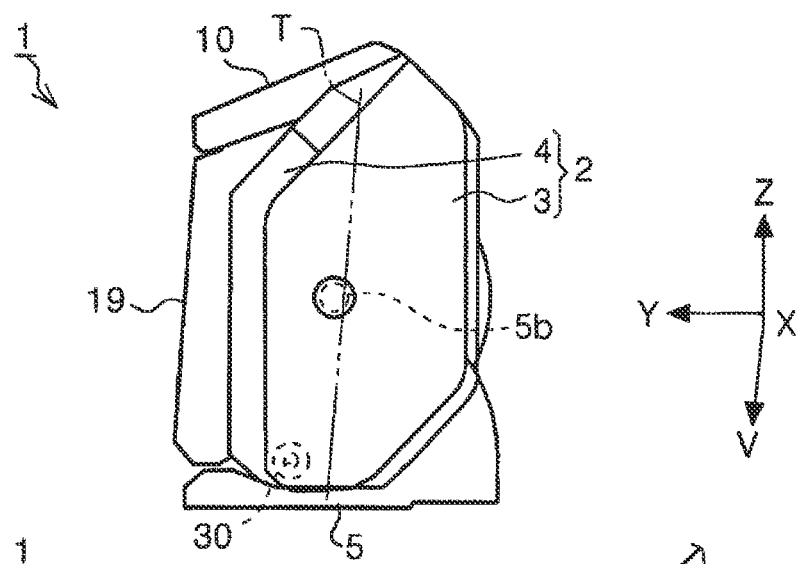
FIG. 4A illustrates the main body of the scanner which has an unused attitude.
Figure 4B:
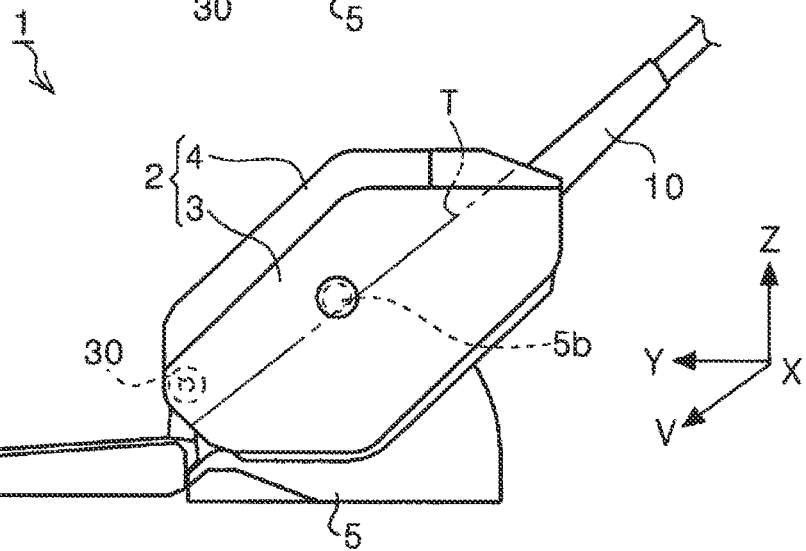
FIG. 4B illustrates the main body of the scanner which has a first read attitude.
Figure 4C:
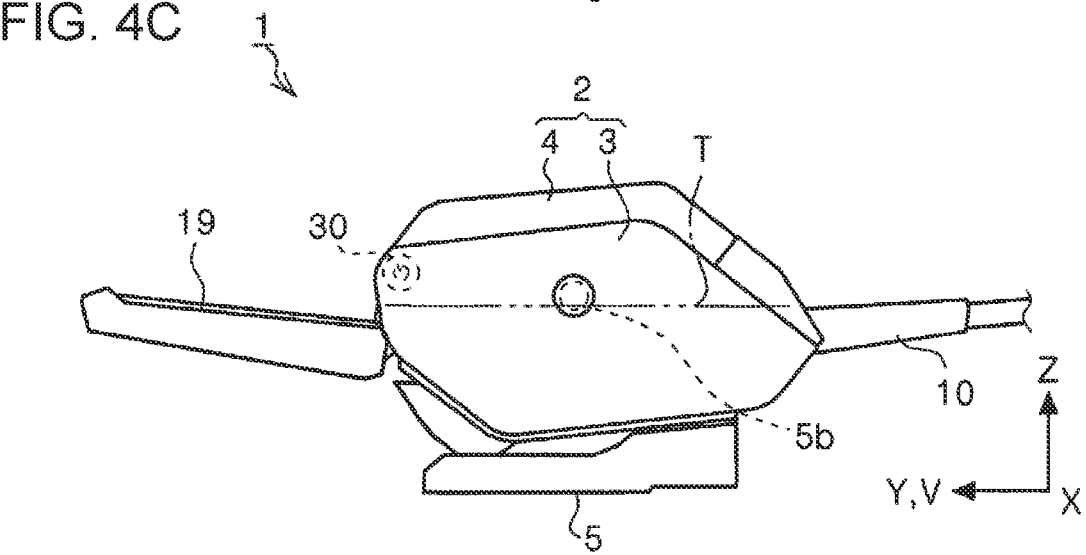
FIG. 4C illustrates the main body of the scanner which has a second read attitude.

The lower unit 3 of the main body 2 is rotatable around a rotation shaft 5b relative to an arm unit 5a of the support stand 5 so that the attitude of the scanner 1 is adjustable. In this embodiment, the main body 2 of the scanner 1 includes a holding mechanism (not illustrated) that retains the scanner 1 in three attitudes. Of these attitudes, two are a sheet reading attitude in which the original sheets M are read, and the remaining one is an unused attitude in which the scanner 1 is not used. The sheet reading attitude corresponds to the attitudes in FIGS. 4B and 4C. In this embodiment, the attitude in FIG. 4B is defined as a first read attitude, whereas the attitude in FIG. 4C is defined as a second read attitude. The unused attitude corresponds to the attitude illustrated in FIG. 4A. When the scanner 1 has the unused attitude, its footprint, or the occupied area on the Y-axis, becomes minimum.

The scanner 1 has a larger footprint when the main body 2 has the first read attitude than when it has the unused attitude. Likewise, the scanner 1 has a larger footprint when the main body 2 has the second read attitude than when it has the first read attitude. When the main body 2 has the first read attitude, the transport direction of the original sheets M, or the +V direction, becomes diagonally downward. When the main body 2 has the second read attitude, the +V direction becomes horizontal. In this case, however, the +V direction does not necessarily have to become substantially horizontal. Actually, the +V direction has only to be closer to horizontal when the main body 2 has the second read attitude than when it has the first read attitude.

The main body 2 is retained in one of the above three attitudes by the holding mechanism (not illustrated), and the attitude retained in this manner can be released by a release lever (not illustrated). Furthermore, which attitude the main body 2 has can be detected by an attitude sensor (not illustrated).

Figure 2:
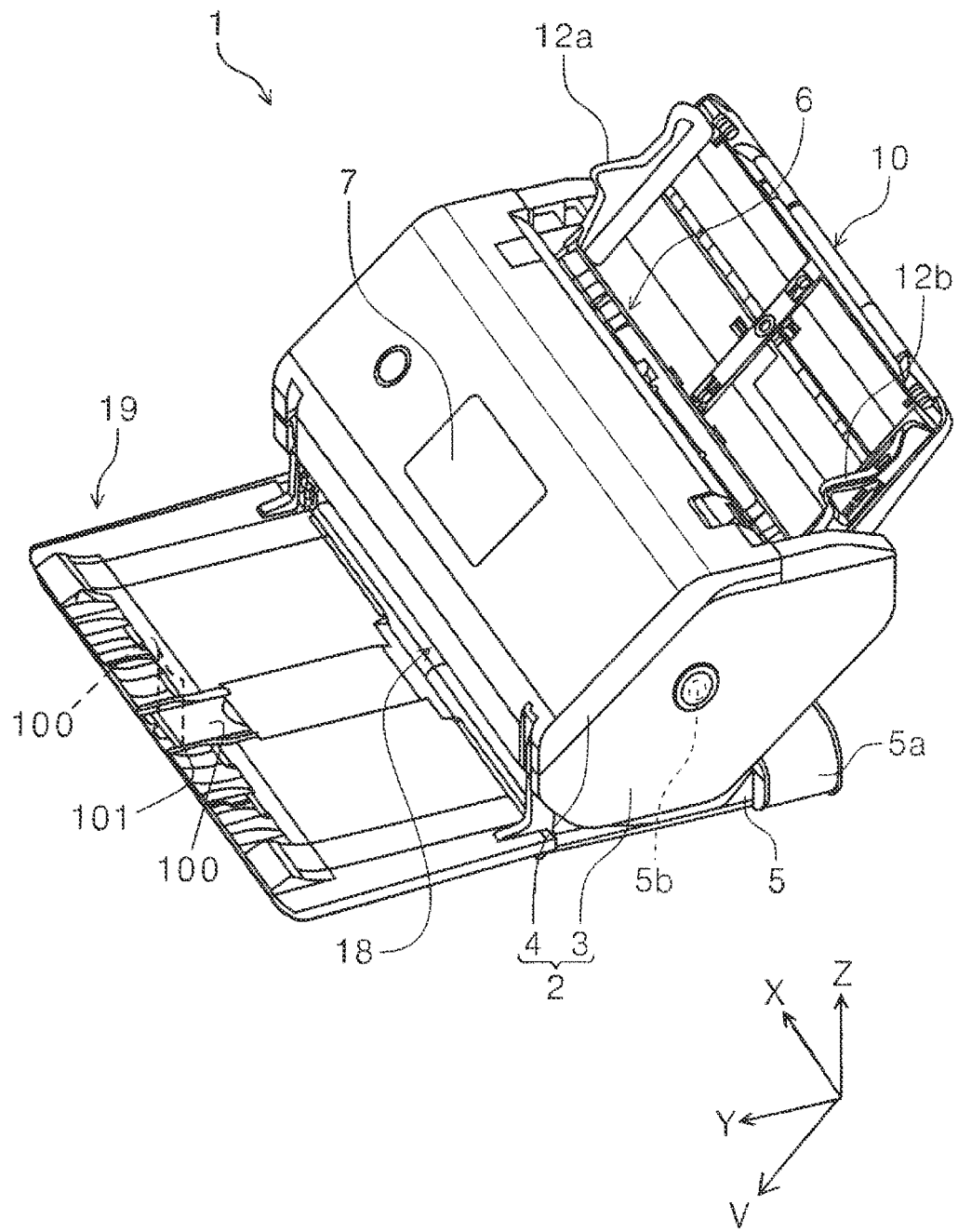
FIG. 2 is a front perspective view of the scanner with its front cover and upper cover open.

The upper unit 4 includes a front cover 19; the lower unit 3 includes an upper cover 10. The front cover 19 is rotatable around the rotation shaft 30 relative to both the lower unit 3 and the upper unit 4 so that the front cover 19 can be switched between a closed state as illustrated in FIG. 1 and an open state as illustrated in FIG. 2. When being in the open state, the front cover 19 serves as an ejection tray to which a read original sheet M is to be ejected. In other words, when being in the open state, the front cover 19 serves as the ejection tray on which a plurality of original sheets M from which images have been read are to be stacked.

As illustrated in FIG. 2, the upper unit 4 has an outer surface with an operation panel 7; the operation panel 7 realizes a user interface that allows a user to perform various reading and setting operations and that displays reading and setting statuses and other information. In this embodiment, the operation panel 7 may be implemented by a touch panel that has both an operation section and a display section. When the front cover 19 is open, the operation panel 7 is exposed.

Figure 3:
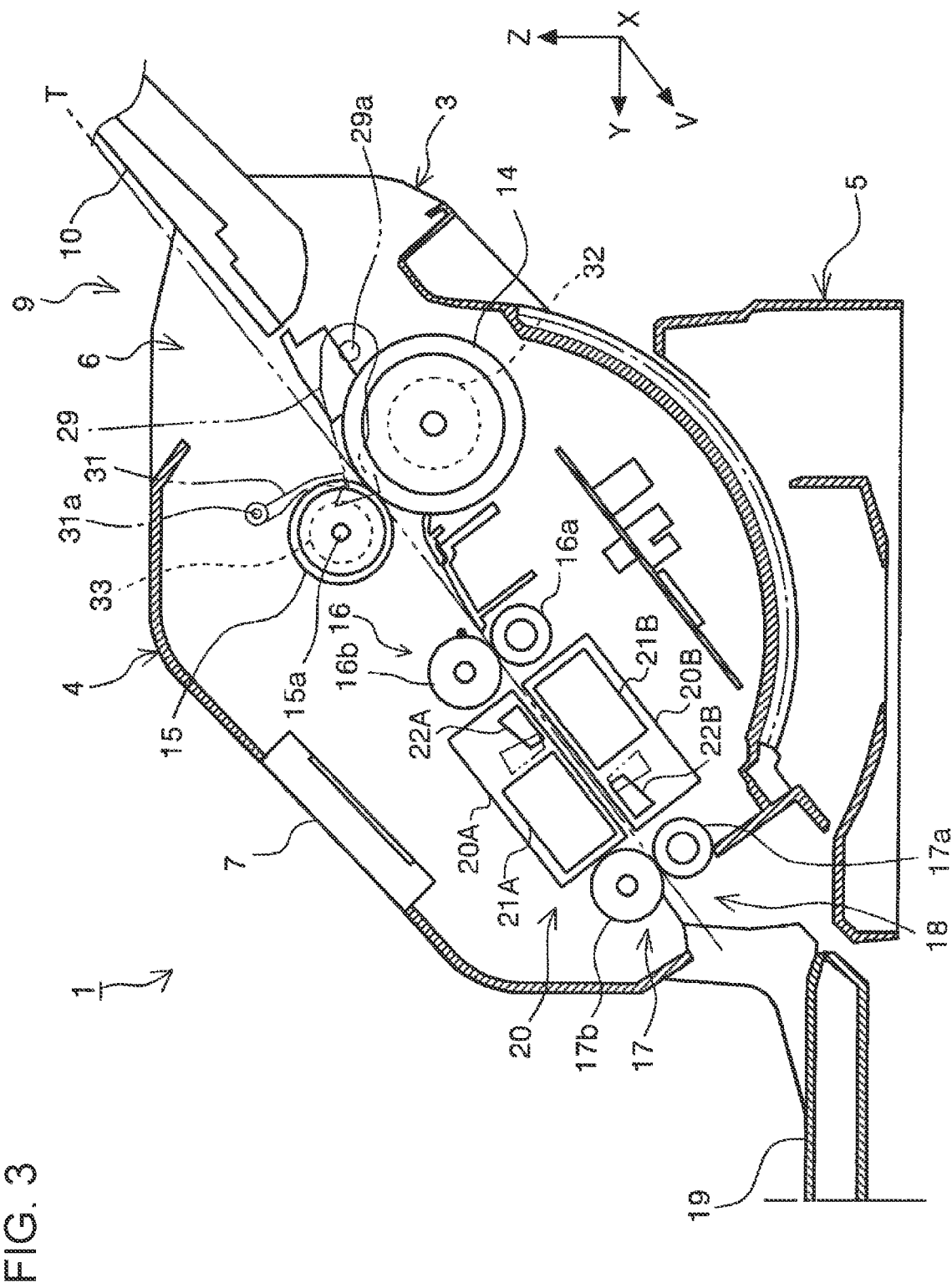
FIG. 3 is a cross-sectional view of a sheet transport route in the scanner as viewed from one side.

The upper cover 10 disposed in the lower unit 3 is rotatable relative to the lower unit 3. When being rotated, the upper cover 10 can be switched between the state as illustrated in FIG. 1 and the state as illustrated in FIG. 2 or 3. When being open, the upper cover 10 serves as a sheet support tray on which an original sheet M that will be supplied into the scanner 1 is to be supported. As illustrated in FIG. 2, the upper cover 10 has edge guides 12a and 12b that guide both the side edges of the original sheet M. The main body 2 includes a supply port 6 that leads to the interior of the main body 2. Via the supply port 6, an original sheet M placed on the upper cover 10 is fed into the main body 2.

Next, the sheet transport route in the scanner 1 will be described mainly with reference to FIG. 3. Between the lower unit 3 and the upper unit 4, the sheet transport route T is formed into a substantially linear shape. When the main body 2 is in the unused attitude, the sheet transport route T has a substantially vertical shape, as illustrated in FIG. 4A. When the main body 2 has the first read attitude, the sheet transport route T forms an angle of about 45° with the floor, as illustrated in FIG. 4B. When the main body 2 has the second read attitude, the sheet transport route T has a substantially horizontal shape, as illustrated in FIG. 4C.

Disposed at the most upstream location of the sheet transport route T is the upper cover 10 described above. Disposed downstream of the upper cover 10 is two rollers: a feed roller 14 that feeds original sheets M placed on the upper cover 10 in the downstream direction; and a separation roller 15 that separates one of the original sheets M from the others and that nips the original sheet M with the feed roller 14. The separation roller 15 is pressed against the feed roller 14 by a load application unit (not illustrated) while applying braking force to a rotation shaft 15a.

When a plurality of original sheets M are placed on the upper cover 10, the first one from the bottom is in contact with the feed roller 14. When this first one is fed into the main body 2 in the downstream direction by the feed roller 14, the second one is fed. In this way, when placed on the upper cover 10, a plurality of original sheets M are sequentially fed in the downstream direction.

Disposed upstream of the separation roller 15 in the sheet transport route T is a flap 31, which suppresses an original sheet M placed on the upper cover 10 from making contact with the separation roller 15 before the original sheet M is fed into the main body 2. The flap 31 is rotatable around a rotation shaft 31a but, before an original sheet M is fed, its lower portion engages with a set guide 29 so that the flap 31 is blocked from rotating clockwise (in the page of FIG. 3). The set guide 29 supports an original sheet M to be fed into the main body 2, thereby blocking the original sheet M from making contact with the feed roller 14. The state of the set guide 29 in this case is referred to as the first state.

When the scanner 1 starts to feed the original sheet M into the main body 2, the set guide 29 rotates around a rotation shaft 29a counterclockwise (in the page of FIG. 3) by virtue of the power from a transport motor 58 (see FIG. 5), thereby bringing the original sheet M into contact with the feed roller 14. The state of the set guide 29 in this case is referred to as the second state. When the set guide 29 switches from the first state to the second state, the flap 31 becomes rotatable. As a result, the front edge of the original sheet M placed on the upper cover 10 is brought into contact with the separation roller 15.

The feed roller 14 is supplied with torque from a feed motor 57 (see FIG. 5) via a one-way clutch 32, thereby rotating counterclockwise (in the page of FIG. 3) to feed an original sheet M in the downstream direction. Hereinafter, the direction in which the feed roller 14 rotates to feed an original sheet M in the downstream direction is referred to as the forward rotation direction, whereas the direction opposite to this forward rotation direction is referred to as the reverse rotation direction. Likewise, the direction in which the feed motor 57 rotates to feed an original sheet M in the downstream direction is referred to as the forward rotation direction, whereas the direction opposite to this forward rotation direction is referred to as the reverse rotation direction.

The one-way clutch 32, which is disposed in the transmission route of the drive force between the feed roller 14 and the feed motor 57, suppresses the feed roller 14 from rotating in the reverse rotation direction even when the feed motor 57 rotates in the reverse rotation direction. When the feed motor 57 does not rotate, the feed roller 14 can rotate in the forward rotation direction while keeping in contact with an original sheet M to be fed.

Disposed in relation to the separation roller 15 is a torque limiter 33. When no or one original sheet M is interposed between the feed roller 14 and the separation roller 15, the feed roller 14 applies torque to the separation roller 15 so as to rotate clockwise (in the page of FIG. 3). Then, when this torque exceeds an upper limit preset by the torque limiter 33, the separation roller 15 starts to slide over the torque limiter 33 and rotate together with the feed roller 14.

When a plurality of original sheets M to be fed are interposed between the feed roller 14 and the separation roller 15, the original sheets M slide over one another, thereby stopping the rotation of the separation roller 15. As a result, the original sheets M other than the first one is fed back in the upstream direction. In this way, a plurality of original sheets M are not fed together.

The above upper cover 10, feed roller 14, and separation roller 15 constitute a medium feeder 9 that feeds media such as original sheets M in cooperation with a transport roller pair 16 and an ejection roller pair 17 (described later) as well as the front cover 19 acting as an ejection stacker. The configuration of the medium feeder 9 may be equivalent to that of the scanner 1 except a reader 20 (described later) that reads original sheets M. However, the configuration of the medium feeder 9 may be equivalent to the entire configuration of the scanner 1 if the scanner 1 is regarded simply as a document transport system.

The transport roller pair 16, the reader 20 that reads original sheets M, and the ejection roller pair 17 are arranged, in this order, downstream of the feed roller 14. The transport roller pair 16 includes: a transport driving roller 16a that rotates by being driven by the transport motor 58; and a transport driven roller 16b that rotates together with the transport motor 58. When nipped between the feed roller 14 and the separation roller 15, an original sheet M is fed in the downstream direction. Then, the original sheet M is nipped in the transport roller pair 16 again and fed to the site positioned between an upper sensor unit 20A and a lower sensor unit 20B and downstream of the transport roller pair 16.

Both of the upper sensor unit 20A and the lower sensor unit 20B constitute the reader 20. The upper sensor unit 20A is disposed in the upper unit 4 above the sheet transport route T, whereas the lower sensor unit 20B is disposed in the lower unit 3 below the sheet transport route T. The upper sensor unit 20A has a sensor module 21A, whereas the lower sensor unit 20B has a sensor module 21B. In this embodiment, each of the sensor modules 21A and 21B may be a contact type of image sensor module. The sensor module 21A that is disposed above the sheet transport route T reads the upper surface of an original sheet M, whereas the sensor module 21B that is disposed below the sheet transport route T reads the lower surface of the original sheet M. In this case, both the surfaces of the original sheet M which are read by the upper sensor unit 20A and the lower sensor unit 20B are positioned in parallel to the sheet transport route T.

The upper sensor unit 20A has a background plate 22A facing the sensor module 21B of the lower sensor unit 20B, whereas the lower sensor unit 20B has a background plate 22B facing the sensor module 21A of the upper sensor unit 20A. Each of the background plates 22A and 22B, which may be made of a resin or metal having a white, grey, or black color, serves as a reference board used for shading compensation and is read by the opposing sensor module.

Each of the background plates 22A and 22B is rotatable by virtue of the power from a motor (not illustrated). Each of the background plates 22A and 22B rotates to switch between an opposing state and a non-opposing state. When being in the opposing state, each of the background plates 22A and 22B faces the opposing sensor module, as indicated by the solid line in FIG. 3. When being in the non-opposing state, each of the background plates 22A and 22B does not face the opposing sensor module, as indicated by the alternate long and two short dashes line. If each of the background plates 22A and 22B has a white color, for example, the opposing sensor module can acquire a white reference value when it is in the opposing state and, in turn, can acquire a black reference value when it is in the non-opposing state.

After an image on the upper or lower surface or images on both the upper and lower surfaces of the original sheet M are read by the reader 20, the original sheet M is nipped in the ejection roller pair 17, acting as an ejection section, disposed downstream of the reader 20 and then ejected to the outside via an ejection port 18. The ejection roller pair 17 includes: an ejection driving roller 17a that rotates by virtue of the power from the transport motor 58; and an ejection driven roller 17b that rotates together with the ejection driving roller 17a.

In this embodiment, as described above, the scanner 1 is provided with the transport motor 58 that serves as a driver that rotates both the transport driving roller 16a and the ejection driving roller 17a. However, the scanner 1 may have another configuration. Alternatively, the scanner 1 may be provided with a first driver that drives the transport driving roller 16a and a second driver that drives the ejection driving roller 17a.

As illustrated in FIG. 2, the front cover 19, or the ejection stacker, has a stopper 100 acting as a suppression section that, after an image has been read from an original sheet M by the reader 20, suppresses the original sheet M from moving to the outside of the scanner 1 beyond the front cover 19. The stopper 100 is rotatable around a pivot shaft 101 extending along the X-axis. The stopper 100 can be switched between an accommodated state and a suppressing state. In the accommodated state, the stopper 100 is accommodated in the front cover 19; in the suppressing state, the stopper 100 is erected on the front cover 19 and acts as the suppression section. In FIG. 2, the solid line indicates the stopper 100 in the accommodated state, and the broken line indicates the stopper 100 in the suppressing state. It should be noted that the front cover 19 illustrated in FIG. 2 may include a plurality of slidable trays, in which case the length of the front cover 19 is adjustable. In addition, the stopper 100 may be slidable over the front cover 19 along the Y-axis, in which case the distance between the stopper 100 and the ejection roller pair 17 is adjustable depending on the length of the front cover 19.

Figure 5:
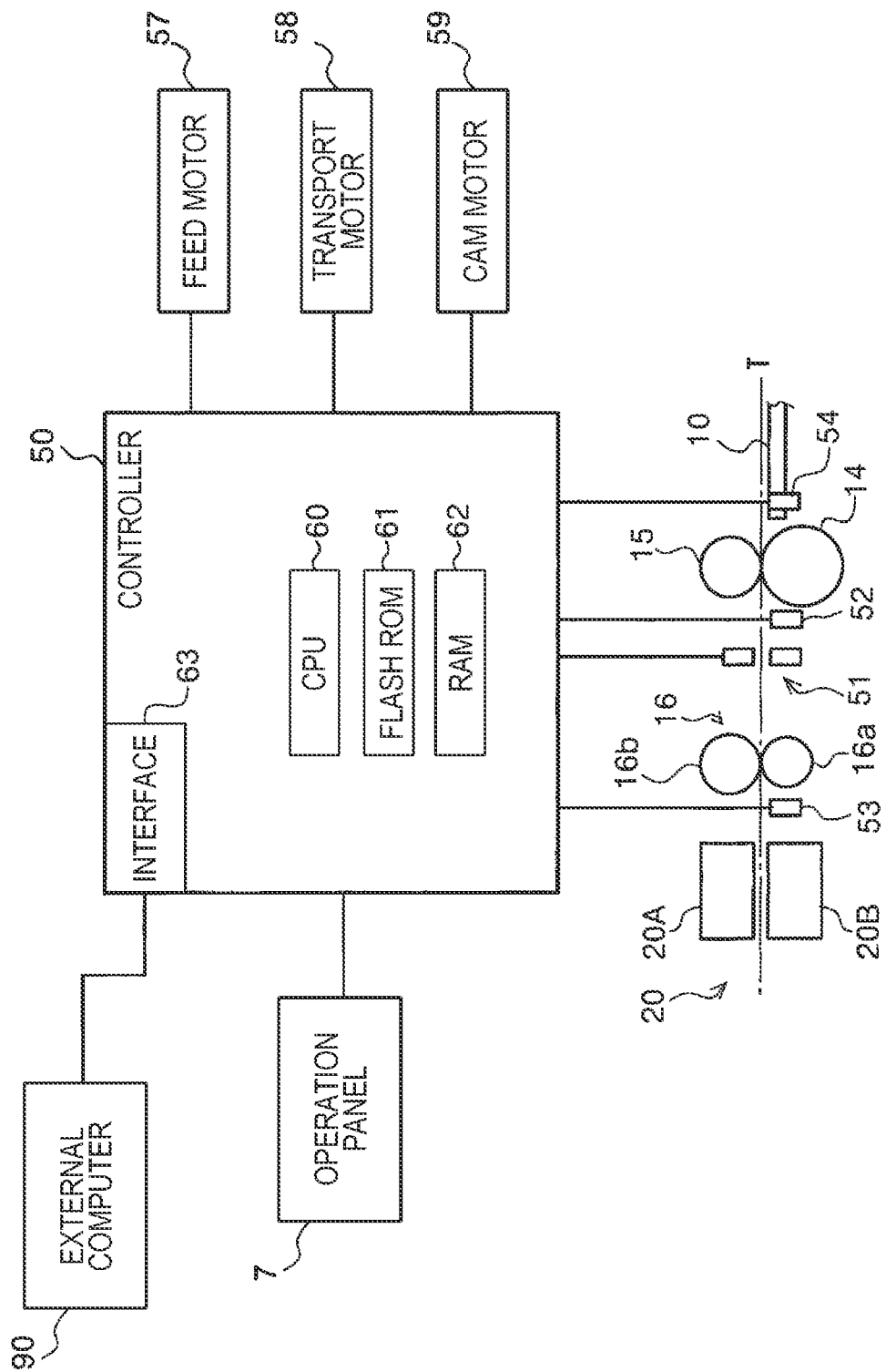
FIG. 5 is a block diagram of a control system in the scanner.

Next, a control system of the scanner 1 will be described below with reference to FIG. 5. The scanner 1 includes a controller 50 that controls various operations, including the supplying, transporting, ejecting, and reading of original sheets M. The controller 50 receives a signal from the user through the operation panel 7 and transmits signals for displaying information, especially signals for realizing the user interface to the operation panel 7.

The controller 50 controls the operations of the feed motor 57, the transport motor 58, and a cam motor 59. In this embodiment, each of the feed motor 57, the transport motor 58, and the cam motor 59 may be a direct current (DC) motor. The controller 50 receives read data from the reader 20 and transmits control signals to the reader 20. Furthermore, the controller 50 receives signals from a placement detector 54, a multi-feed detector 51, a first sheet detector 52, and a second sheet detector 53. The controller 50 also receives detection values from rotary encoders (not illustrated) disposed in the feed motor 57, the transport motor 58, and the cam motor 59. In this way, the controller 50 can grasp the rotational amounts of the feed motor 57, the transport motor 58, and the cam motor 59 and thus the movement amount of an object to be driven.

The controller 50 includes a central processing unit (CPU) 60, flash read-only memory (ROM) 61, and random-access memory (RAM) 62. The CPU 60 performs various arithmetic processes in accordance with programs stored in the flash ROM 61, thereby controlling an entire operation of the scanner 1. The flash ROM 61, which may be nonvolatile readable and writable memory, is an example of a storage unit. The flash ROM 61 also stores various setting information that the user enters through the operation panel 7. The RAM 62, which is also an example of the storage unit, temporarily stores various information. The controller 50 further includes an interface 63, via which the controller 50 can communicate with an external computer 90.

Figure 6:
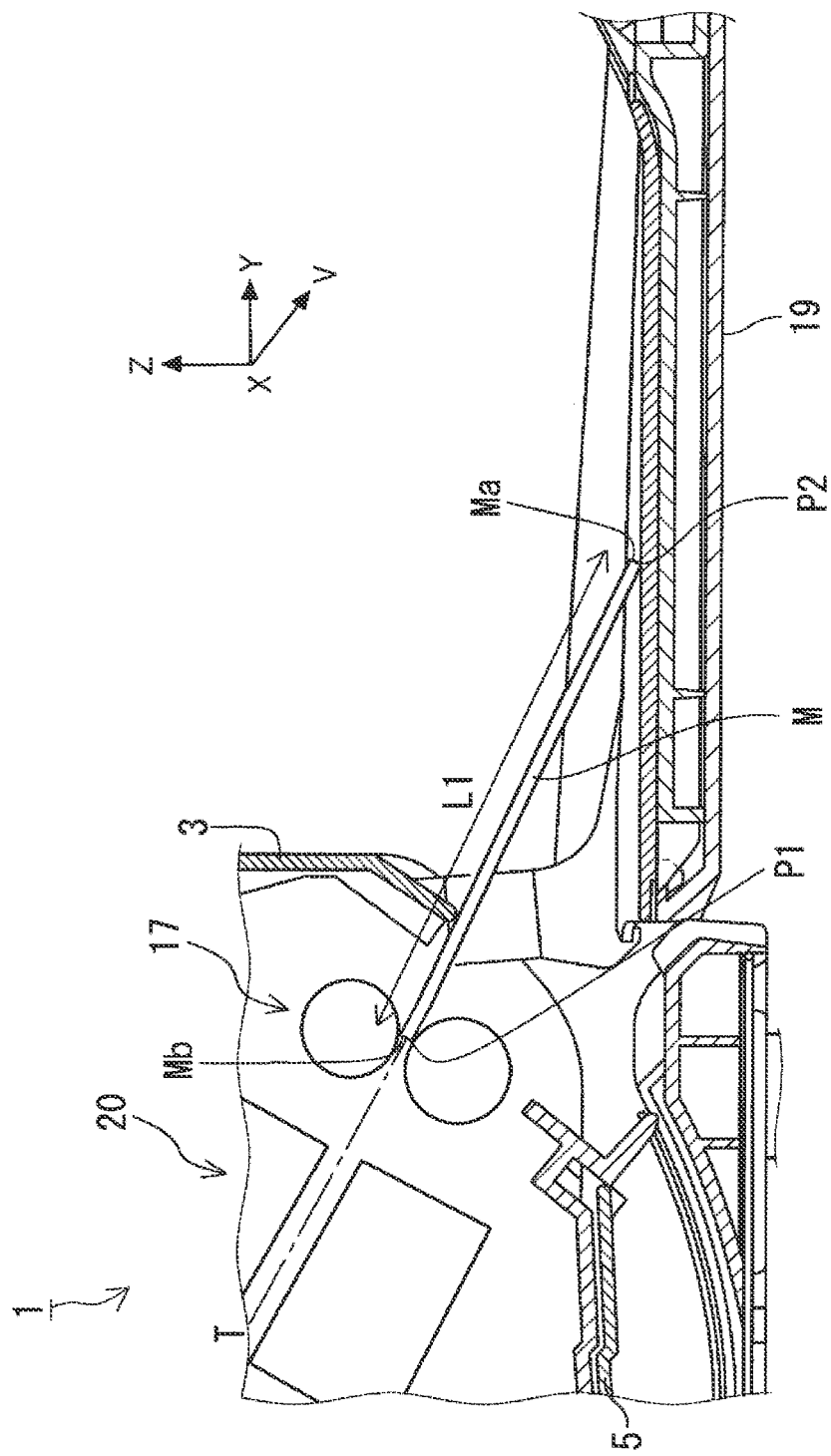
FIG. 6 is a cross-sectional view of an ejection section and an ejection stacker in the scanner as viewed from one side.
Figure 7:
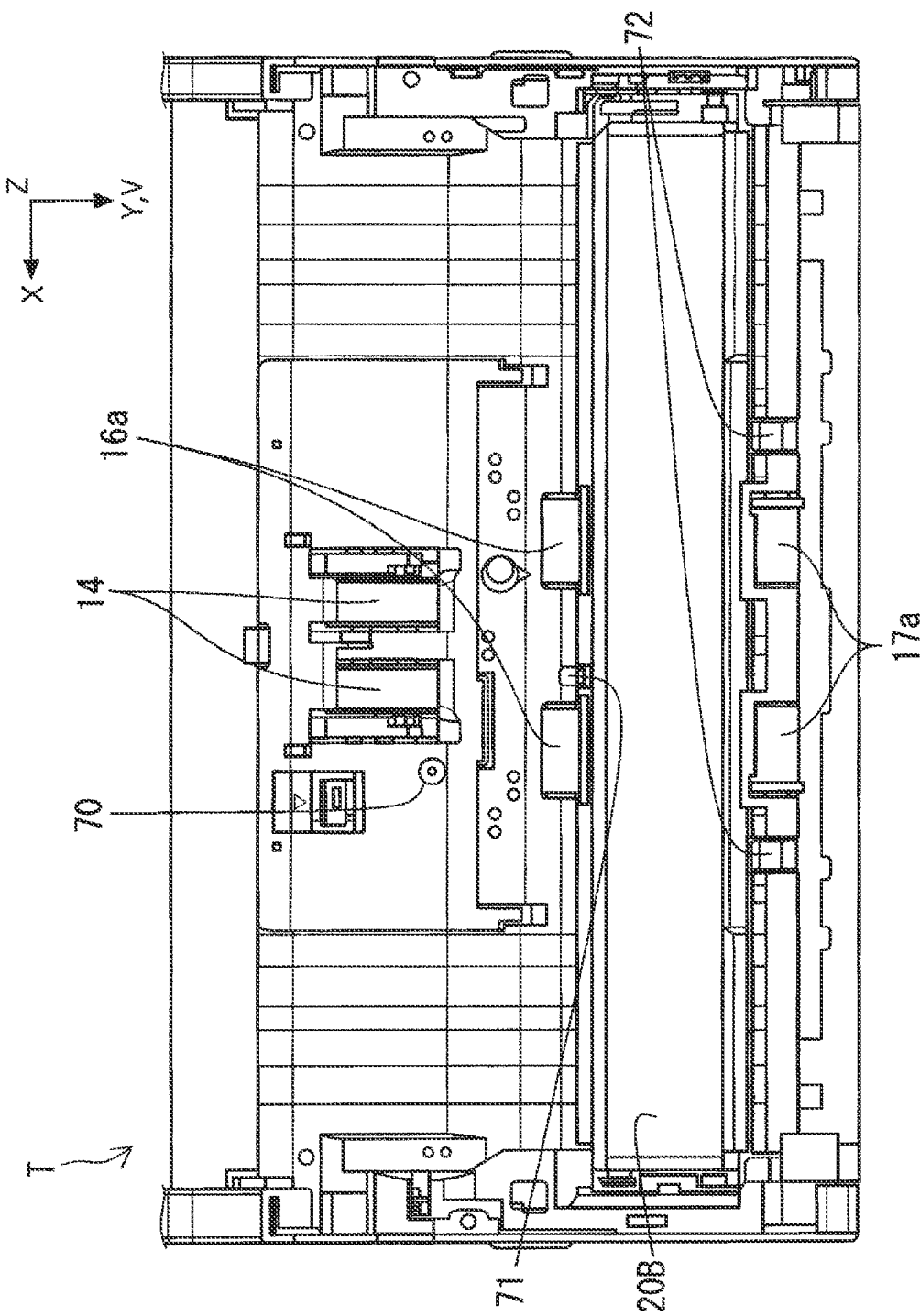
FIG. 7 is a plan view of the sheet transport route in the scanner.

With reference to FIGS. 6 and 7, a detailed description will be given below of the sheet transport route T, the ejection roller pair 17, and the front cover 19 in the scanner 1. In this case, the sheet transport route T serves as the transport route of original sheets M; the ejection roller pair 17 serves as the ejection section; and the front cover 19 serves as the ejection stacker. As illustrated in FIG. 6, after an image has been read from an original sheet M by the reader 20, the original sheet M is ejected from the ejection roller pair 17 to a nip point P1 on the front cover 19. Then, the original sheet M is fed to a contact point P2 positioned on the extension of the sheet transport route T in the +V direction. If the length of the original sheet M in the transport direction is longer than a distance L1 between the nip point P1 and the contact point P2, when a front edge Ma of the original sheet M makes contact with the contact point P2 on the front cover 19, the original sheet M slides over the front cover 19 and then is placed thereon. If the length of the original sheet M in the transport direction is shorter than the distance L1, the original sheet M is ejected to and placed on the front cover 19 before the front edge Ma makes contact with the contact point P2 on the front cover 19.

As illustrated in FIG. 7, the scanner 1 further includes a medium-edge detector 71 as a medium detector that measures the length of an original sheet M in the transport direction by detecting the presence of the original sheet M. More specifically, the medium-edge detector 71 detects the front edge Ma and a rear edge Mb of the original sheet M when the original sheet M is transported along the sheet transport route T. Herein, the front edge Ma and rear edge Mb of the original sheet M correspond to both the edges of the original sheet M in the transport direction. In this way, the scanner 1 can easily measure the length of the original sheet M by detecting both the edges of the original sheet M in the transport direction.

In the scanner 1, the transport roller pair 16 acting as the transport section may insert the original sheet M into a transparent case and then may transport this transparent case. As illustrated in FIG. 7, the scanner 1 further includes a transparent-case detector 70 as another medium detector that measures the length of the original sheet M in the transport direction by detecting the presence of the original sheet M. More specifically, the transparent-case detector 70 measures the length of the original sheet M in the transport direction, based on the location of the transparent case being transported. In this way, even if an original sheet M is difficult to transport, the scanner 1 can easily transport the original sheet M by inserting the original sheet M into a transparent case. Furthermore, the scanner 1 can measure the length of the original sheet M accurately even if the original sheet M is inserted into the transparent case and transported. In this embodiment, the transparent case may have a plurality of through-holes formed so as to face the transparent-case detector 70 when being transported in the scanner 1. In this case, the transparent-case detector 70 can detect the location of the transparent case by detecting the through-holes. However, the transparent case and the transparent-case detector 70 may have any other configurations. Instead of the medium-edge detector 71 and the transparent-case detector 70, a contact image sensor (CSI) or an encoder that reads an image on an original sheet M may be used as each medium detector.

In the scanner 1, a medium detector (the medium-edge detector 71 or the transparent-case detector 70) detects the presence of an original sheet M or a transparent case. Then, based on this detection result, the controller 50 determines the length of the original sheet M. In this case, the length of the original sheet M may be equivalent to a detection value of the medium detector, a value obtained by adding a margin for the diagonal inclination of the original sheet M to the detection value of the medium detector, or a value obtained by converting the detection value of the medium detector to the A4- or A5-size or other existing document sizes. In this embodiment, the length of the original sheet M is equivalent to a value obtained by adding a margin for the diagonal inclination of the original sheet M to the detection value of the medium detector.

As illustrated in FIG. 7, the scanner 1 further includes two stiffening sections 72, each formed of a projection, that stiffen a curled original sheet M ejected from the transport roller pair 16. When the original sheet M is ejected from the transport roller pair 16, the stiffening sections 72 cause the original sheet M to become wavy as viewed from the ejection direction. In this way, both of the stiffening sections 72 help the original sheet M get stacked in an orderly fashion on the front cover 19 without causing the original sheet M to be curled as viewed from the +X or −X direction.

Figure 8:
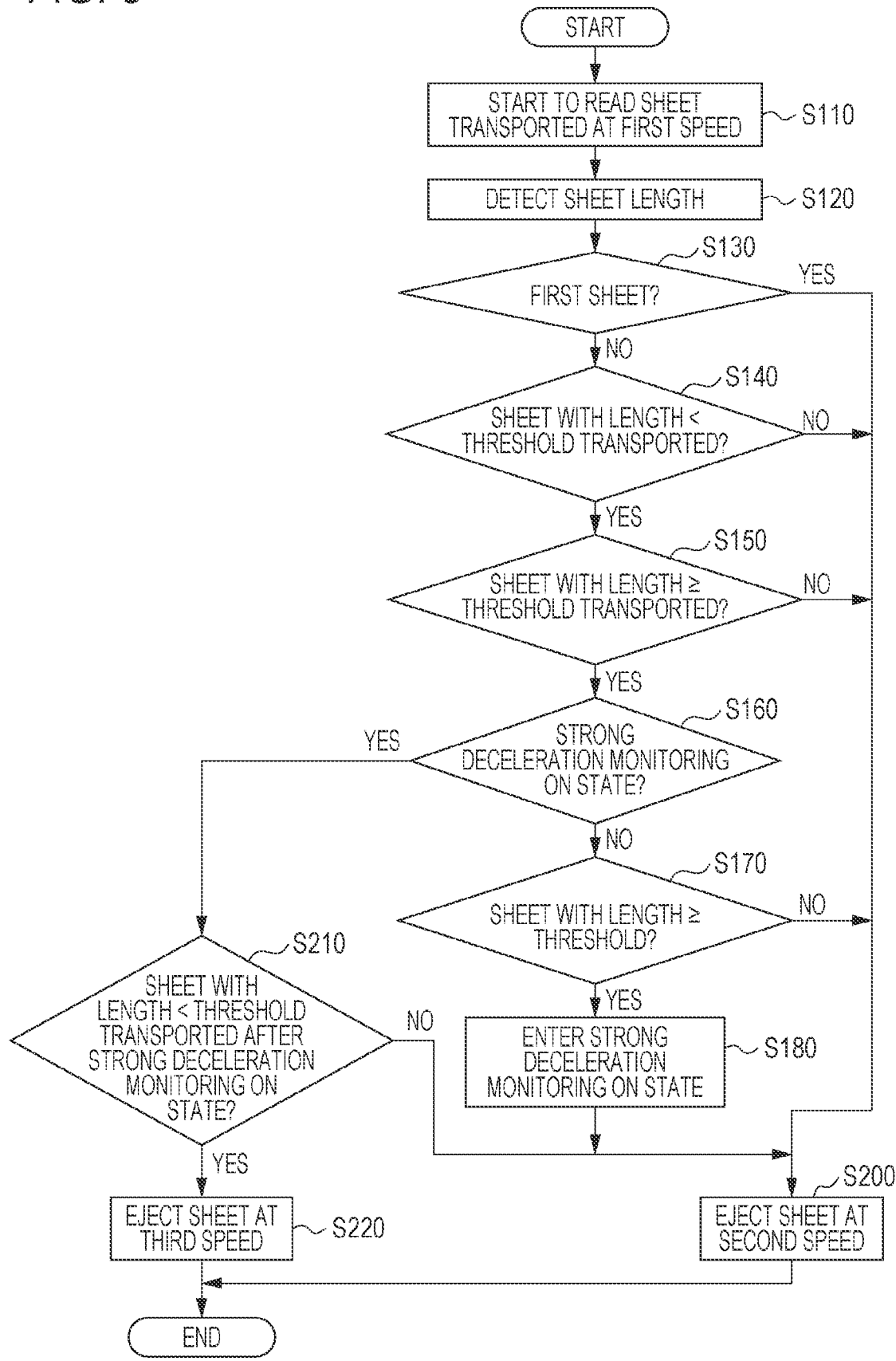
FIG. 8 is a flowchart of an example of a process in which the scanner ejects media.

With reference to FIGS. 8 and 9, a description will be given below of an example of a process in which the scanner 1 ejects original sheets M. The scanner 1 is an example of an image reading apparatus configured to sequentially read images from original sheets M having different lengths in the transport direction. It should be noted that, of a series of original sheets M for a single job, only one original sheet M is ejected by the process according to the flowchart of FIG. 8; however, all of the original sheets M are actually ejected in a sequence through this process.

The ejection process according to the flowchart of FIG. 8 starts with Step S110, at which the scanner 1 starts to read an image from an original sheet M. More specifically, the feed roller 14 feeds the original sheet M along the sheet transport route T. Then, the transport roller pair 16 transports the original sheet M at a first speed. In this case, the first speed is set to about 492 mm/sec, for example.

At Step S120, the scanner 1 measures the length of the original sheet M. More specifically, if the transport roller pair 16 transports the original sheet M by using a transparent case, the controller 50 determines the length of the original sheet M based on a detection result of the transparent-case detector 70. If the transport roller pair 16 directly transports the original sheet M, the controller 50 determines the length of the original sheet M based on a detection result of the medium-edge detector 71. It should be noted that, if the location of the transparent case is shifted from that of the transparent-case detector 70 during the transportation, the controller 50 may determine the length of the original sheet M based on the detection result of the medium-edge detector 71.

At Step S130, the controller 50 determines whether the original sheet M from which the image has been read by the reader 20 corresponds to a first one of the original sheets M for the job. When the controller 50 determines that the original sheet M corresponds to the first one (Yes at S130), the process proceeds to Step S200, at which the ejection roller pair 17 ejects, at a second speed, the original sheet M from the image has been read by the reader 20 to the front cover 19. In this case, the second speed is equal to or lower than the above first speed and is set to about 375 mm/sec, for example. When the controller 50 determines that the original sheet M does not correspond to the first one (No at S130), the process proceeds to Step S140.

At Step S140, the controller 50 determines whether, of the original sheets M for the job from which the images have been read by the reader 20, any original sheet M the length of which is less than a threshold has ever been transported. In this case, the threshold may be set to the distance L1 between the nip point P1 and the contact point P2. When the controller 50 determines that no original sheets M the lengths of which are less than the threshold have been transported (No at Step S140), the process proceeds to Step S200. When the controller 50 determines that at least one original sheet M the length of which is less than the threshold has been transported (Yes at Step S140), the process proceeds to Step S150. It should be noted that the threshold may be set in any other way. For example, the threshold may be set based on the A4 size or a card size.

At Step S150, the controller 50 determines whether, of the original sheets M for the job from which the images have been read by the reader 20, any original sheet M the length of which is equal to or more than the threshold has ever been transported. In this case, the threshold may also be set to the distance L1 between the nip point P1 and the contact point P2. When the controller 50 determines that no original sheets M the lengths of which are equal to or more than the threshold have been transported (No at Step S150), the process proceeds to Step S200. When the controller 50 determines that at least one original sheet M the length of which is equal to or more than the threshold has been transported (Yes at Step S150), the process proceeds to Step S160. In other words, at Steps S140 and S150 described above, the controller 50 determines whether the original sheets M for the job include both an original sheet M the length of which is less than the threshold and an original sheet M the length of which is equal to or more than the threshold.

At Step S160, the controller 50 determines whether the scanner 1 is in a strong deceleration monitoring ON state. In other words, the controller 50 determines whether the scanner 1 has performed Step S180 (described later) since the scanner 1 started the ejection process on the original sheets M for the job in accordance with the flowchart of FIG. 8. When the controller 50 determines that the scanner 1 is in the strong deceleration monitoring ON state (Yes at S160), the process proceeds to Step S210. When the controller 50 determines that the scanner 1 is not in the strong deceleration monitoring ON state (No at S160), the process proceeds to Step S170.

At Step S170, the controller 50 determines whether the length of the original sheet M from which the image is being read by the reader 20 is equal to or more than the threshold. When the controller 50 determines that the length of the original sheet M is less than the threshold (No at S179), the process proceeds to Step S200. When the controller 50 determines that the length of the original sheet M is equal to or more than the threshold (Yes at S179), the process proceeds to Step S180.

At Step S180, the scanner 1 enters the strong deceleration monitoring ON state, where the ejection roller pair 17 will eject subsequent original sheets M from which the images have been read by the reader 20 to the front cover 19 at a third speed. In this case, the third speed is lower than the above second speed. In short, after having transported an original sheet M the length of which is less than the threshold and an original sheet M the length of which is equal to or more than the threshold, the scanner 1 enters the strong deceleration monitoring ON state when transporting an original sheet M the length of which is equal to or more than the threshold. After the completion of Step S180, the process proceeds to Step S200.

At Step S210, the controller 50 determines whether the transport roller pair 16 has transported any original sheet M the length of which is less than the threshold after the scanner 1 has entered the strong deceleration monitoring ON state. Then, when the controller 50 determines that the transport roller pair 16 has transported no original sheets M the lengths of which are less than the threshold after the scanner 1 has entered the strong deceleration monitoring ON state (No at S210), the process proceeds to Step S200. When the controller 50 determines that the transport roller pair 16 has transported at least one original sheet M the length of which is less than the threshold after the scanner 1 has entered the strong deceleration monitoring ON state (Yes at S210), the process proceeds to Step S220. In short, even after the scanner 1 has entered the strong deceleration monitoring ON state, the ejection roller pair 17 keeps ejecting the original sheets M to the front cover 19 at the second speed as long as the transport roller pair 16 transports original sheets M the lengths of which are equal to or more than the threshold.

At Step S220, the ejection roller pair 17 ejects original sheets M from which the images have been read by the reader 20, to the front cover 19 at the third speed. In this case, the third speed is set to 101 mm/sec, for example. After having performed Step S200 or S220, the scanner 1 concludes the ejection process for a single document in accordance with the flowchart of FIG. 8. Then, the scanner 1 starts to perform the ejection process at Steps S110 to S220 on the next original sheet M for the job. When being in the strong deceleration monitoring ON state, the scanner 1 is switched to a strong deceleration monitoring OFF state every time the scanner 1 concludes the ejection process for a single document in accordance with the flowchart of FIG. 8. According to the flowchart of FIG. 8, when subsequently transporting a first original sheet M the length of which is equal to or more than the threshold and a second original sheet M the length of which is less than the threshold, the scanner 1 ejects the first and second original sheets M to the front cover 19 at the second speed. In this case, alternatively, the scanner 1 ejects the first and second original sheets M to the front cover 19 at the third speed.

Suppose an example in which, in accordance with the flowchart of FIG. 8, the scanner 1 sequentially performs the ejection process on the following four original sheets M for a single job: the first original sheet M the length of which is less than the threshold; the second original sheet M the length of which is equal to or more than the threshold; the third original sheet M the length of which is less than the threshold; and the fourth original sheet M the length of which is equal to or more than the threshold. In this example, the scanner 1 ejects the first and second original sheets M at the second speed, after which the scanner 1 enters the strong deceleration monitoring ON state. Then, the scanner 1 ejects the third and fourth original sheets M at the third speed.

Suppose another example in which, in accordance with the flowchart of FIG. 8, the scanner 1 sequentially performs the ejection process on the following three original sheets M for a single job: the first original sheet M the length of which is less than the threshold; the second original sheet M the length of which is equal to or more than the threshold; and the third original sheet M the length of which is equal to or more than the threshold. In this example, the scanner 1 ejects the first and second original sheets M at the second speed, after which the scanner 1 enters the strong deceleration monitoring ON state. In this case, the scanner 1 has transported no original sheets M the lengths of which are less than the threshold since the scanner 1 entered the strong deceleration monitoring ON state. Therefore, the scanner 1 ejects the third original sheet M at the second speed.

Suppose further another example in which, in accordance with the flowchart of FIG. 8, the scanner 1 sequentially performs the ejection process on the following three original sheets M for a single job: the first original sheet M the length of which is equal to or more than the threshold; the second original sheet M the length of which is equal to or more than the threshold; and the third original sheet M the length of which is equal to or more than the threshold. In this example, the scanner 1 does not enter the strong deceleration monitoring ON state because the scanner 1 transports no original sheets M the lengths of which are less than the threshold. Therefore, the scanner 1 ejects the first to third original sheets M at the second speed.

FIG. 9 is a graph showing a varying rotation speed of the transport driving roller 16a and the ejection driving roller 17a with time when the transport driving roller 16a and the ejection driving roller 17a transport a series of original sheets M for a single job. In this case, the transport driving roller 16a and the ejection driving roller 17a eject an n-th original sheet M at the second speed and an (n+1)-th original sheet M at the third speed. In this embodiment, the transport driving roller 16a and the ejection driving roller 17a have the same outer diameter and rotate at the same speed and in synchronization with each other by being driven by a common driver, or the transport motor 58 in this embodiment.

The transport driving roller 16a and the ejection driving roller 17a transport the n-th original sheet M at the first speed while the reader 20 is reading an image therefrom. In FIG. 9, the time zone in which the n-th original sheet M is being transported at the first speed corresponds to that in which the image is being read from the n-th original sheet M. After the reader 20 has read the n-th original sheet M, the controller 50 slightly decreases the rotation speed of the transport driving roller 16a and the ejection driving roller 17a and then causes the ejection roller pair 17 to eject the n-th original sheet M at the second speed. In this case, the period over which the transport driving roller 16a and the ejection driving roller 17a rotate at the slightly decreased speed is determined in consideration of the transport rate of an original sheet M in the transport direction and some margin. One reason why some margin is necessary is that, when an original sheet M is diagonally transported along the sheet transport route T, its apparent length tends to be longer than its actual one. Thus, the margin may be set based on the difference between the apparent and actual lengths when an original sheet M is transported at an angle of about 20°. After having ejected the n-th original sheet M, the transport driving roller 16a and the ejection driving roller 17a increase their rotation speed to the first speed. Then, the reader 20 starts to read an image from an (n+1)-th original sheet M. It should be noted that the condition for setting the margin may depend on a modification capacity of firmware or an application software installed in the external computer 90.

The transport driving roller 16a and the ejection driving roller 17a also transport the (n+1)-th original sheet M at the first speed while the reader 20 is reading the image therefrom. In FIG. 9, the time zone in which the (n+1)-th original sheet M is being transported at the first speed corresponds to that in which the image is being read from the (n+1)-th original sheet M. After the reader 20 has read the image from the (n+1)-th original sheet M, the controller 50 greatly decreases the rotation speed of the transport driving roller 16a and the ejection driving roller 17a and then causes the ejection roller pair 17 to eject the (n+1)-th original sheet M at the third speed. In this case, the period over which the transport driving roller 16a and the ejection driving roller 17a rotate at the greatly decreased speed is set in consideration of the transport rate of an original sheet M and some margin, similar to the manner in which the period for the slightly decreased speed is set. After having ejected the (n+1)-th original sheet M, the transport driving roller 16a and the ejection driving roller 17a increase their rotation speed to the first speed. Then, the reader 20 starts to read an image from an (n+2)-th original sheet M. As described above, once the scanner 1 enters the strong deceleration monitoring ON state, the transport driving roller 16a and the ejection driving roller 17a continue to eject original sheets M at the third speed.

In the scanner 1, as described above, the transport driving roller 16a subsequently transports a series of original sheet M along the sheet transport route T, and the ejection roller pair 17 subsequently ejects the original sheets M. Both of the transport driving roller 16a and the ejection roller pair 17 rotate in synchronization with each other. Furthermore, the controller 50 controls both the transport driving roller 16a and the ejection roller pair 17 in such a way that original sheets M always pass through the image reading site of the reader 20 at the first speed. This is because the reader 20 in the scanner 1 is basically configured to read images from the original sheets M being transported at a constant speed. In FIG. 9, the period over which the n-th original sheet M is ejected at the second speed and the time interval between when the n-th original sheet M is ejected and when the (n+1)-th original sheet M is fed to the image reading site are set in conformity of this configuration of the reader 20. In short, the controller 50 controls both the transport driving roller 16a and the ejection driving roller 17a in such a way that the distances between original sheets M do not excessively decrease, namely, in such a way that the original sheets M do not pass through the image reading site of the reader 20 at speeds lower than the first speed.

As described above, the transport driving roller 16a that transports an original sheet M along the sheet transport route T and the ejection driving roller 17a that ejects the original sheet M may be driven by different drivers. In this case, the controller 50 also needs to control both the transport driving roller 16a and the ejection driving roller 17a in such a way that the original sheets M do not pass through the image reading site of the reader 20 at speeds lower than the first speed. However, the controller 50 may set the time interval between when the n-th original sheet M is ejected and when the (n+1)-th original sheet M is fed to the image reading site differently from that of the scanner 1 in this embodiment. More specifically, even when the ejection driving roller 17a ejects a first original sheet M at a decreased speed, the transport driving roller 16a can eject a second original sheet M at the same speed as the transport speed at which the second original sheet M has been read unless the second original sheet M rides on the first original sheet M.

In the foregoing embodiment, as described above, a scanner 1 is an image reading apparatus configured to sequentially read images from a plurality of original sheets M having different lengths in a transport direction. The scanner 1 includes: a transport roller pair 16 that transports the original sheets M at a first speed along a sheet transport route T by being driven by a transport motor 58; a reader 20 that reads the images from the original sheets M being transported at the first speed along the sheet transport route T; an ejection roller pair 17 that ejects, by being driven by the transport motor 58, the original sheets M from which the images have been read by the reader 20 to a front cover 19; and a transparent-case detector 70 and a medium-edge detector 71 each of which acts as a medium detector. In accordance with the flowchart of FIG. 8, a controller 50 in the scanner 1 determines the lengths of the original sheets M based on detection results of the medium detector. When determining that a length of an original sheet M is equal to or more than a threshold and then determining that a length of a subsequent original sheet M is equal to or more than the threshold, the controller 50 performs weak deceleration control under which the transport roller pair 16 changes an ejection speed of the subsequent original sheet M from the first speed to a second speed, the second speed being lower than the first speed. When determining that a length of an original sheet M is equal to or more than the threshold and then determining that a length of a subsequent original sheet M is less than the threshold, the controller 50 performs strong deceleration control under which the transport roller pair 16 changes the ejection speed from the first speed to a third speed, the third speed being lower than the second speed.

The scanner 1 is configured to eject the original sheets M at a speed equal to or lower than a transport speed of the original sheets M from which images are being read. After the scanner 1 has ejected a long original sheet M and then a short original sheet M, the scanner 1 ejects the next original sheet M at a greatly decreased speed. As the scanner 1 ejects original sheets M at a lower speed, it takes a longer time to read images from all the original sheets M, but the original sheets M are more likely to be stacked in an orderly fashion on the front cover 19. In general, when a scanner ejects a long original sheet M and a short original sheet M in this order, the original sheets M may be stacked randomly on the front cover 19. This is because the scanner tends to avoid ejecting original sheets M at a low speed in order to read the images from the original sheets M in a short time. Moreover, when the scanner ejects a long original sheet M, which tends to be stacked in an orderly fashion, and a short original sheet M in this order at the same speed, only the short original sheet M may be stacked randomly. In this embodiment, the scanner 1 ejects original sheets M having different lengths at a greatly decreased speed as necessary, thereby suppressing the original sheets M from being stacked randomly. In this way, the scanner 1 successfully stacks a plurality of original sheets M having different lengths in an orderly fashion on the front cover 19.

As described above, the threshold may be set to a distance L1, in an ejection direction, between a nip point P1 and a contact point P2; the nip point P1 refers to a point at which the ejection roller pair 17 ejects the original sheets M, and the contact point P2 refers to a point at which front edges of the original sheets M make contact with the front cover 19. For example, if the ejection roller pair 17 ejects a hard original sheet M the length of which exceeds the distance L1 between the nip point P1 and the contact point P2 in the ejection direction, this original sheet M may jam between the ejection roller pair 17 and the front cover 19, thus causing an ejection failure. This ejection failure is more likely to occur as the ejection speed decreases. In this embodiment, however, the scanner 1 sets the threshold to the distance L1 between the nip point P1 and the contact point P2, thereby reducing the risk of original sheets M being ejected under the condition in which the above ejection failure is likely to occur. On the other hand, if original sheets M do not make contact with the front cover 19 upon the ejection, they may be stacked randomly. However, the scanner 1 brings portions of original sheets M into contact with the front cover 19 upon the ejection, thereby generating braking force between these portions and the front cover 19, which is effective in suppressing the original sheets M from being stacked randomly.

The scanner 1 may support a low-speed transport mode in which the transport roller pair 16 transports the original sheets M at a fourth speed, the fourth speed being lower than the first speed, and in which the reader 20 reads the images from the original sheets M being transported at the fourth speed along the sheet transport route T. In this case, the fourth speed is set to 370 mm/sec, for example. When the low-speed transport mode is selected, the controller 50 may control the transport motor 58 in such a way that the ejection roller pair 17 ejects the original sheets M to the front cover 19 at the fourth speed. In short, the scanner 1 supports the low-speed transport mode and, when the low-speed transport mode is selected, causes the transport motor 58 to eject the original sheet M to the front cover 19 at the fourth speed, which is lower than the first speed. In this way, the scanner 1 successfully stacks the original sheets M in an orderly fashion on the front cover 19.

As described above, when the low-speed transport mode is selected, the scanner 1 does not have to perform the ejection process in accordance with the flowchart of FIG. 8. In other words, when the transport speed of the original sheet M becomes lower than a predetermined speed during the reading of the image, the scanner 1 does not have to set the transport speed of the original sheet M to be lower than that during the reading of the image. In this case, the predetermined speed is not limited to a specific value but may be set to 375 mm/sec. Alternatively, the predetermined speed may be set to the transport speed when the reader 20 reads the image at a resolution of about 300 dpi. In general, as the reader 20 reads the image at a higher resolution, the transport speed becomes lower. If the scanner 1 supports a plurality of image reading modes having different transport speeds, the scanner 1 may employ, as one or more modes, the first speed (the transport speed of the original sheet M during the reading of the image), the second speed (the slightly decreased speed, which is equal to or lower than the first speed), and the third speed (the greatly decreased speed, which is lower than the second speed) in accordance with the flowchart of FIG. 8. This scheme also falls within the scope of the present disclosure.

When the transport roller pair 16 sequentially transports a series of original sheets M in accordance with the flowchart of FIG. 8 and further sequentially transports another series of original sheets M in accordance with the flowchart of FIG. 8, for example, the controller 50 may determine whether to switch between the weak deceleration control and the strong deceleration control every time each of the series of original sheets M is transported. When the scanner 1 performs a plurality of jobs, the controller 50 may reset the strong deceleration control for each of the jobs. In this way, the scanner 1 successfully selects transport speeds of original sheets M so as to be suitable for each job.

As described above, the scanner 1 may determine each of the periods for the weak deceleration control and the strong deceleration control, based on a measurement of the medium detector for detecting the lengths of the original sheets M in the transport direction, plus some margin. More specifically, since an apparent length of an original sheet M in the transport direction may increase when the original sheet M is diagonally transported, the scanner 1 allows for this increase as the margin. Consequently, even when diagonally transporting original sheets M, the scanner 1 suppresses one of the original sheets M from riding on another, thereby successfully reducing the risk of failures to transport the original sheets M and to read images from the original sheets M.

As described above, the scanner 1 may further include a feed roller 14 as a feeder that feeds the original sheets M along the sheet transport route T. The controller 50 may control the feed roller 14 in such a way that, after the ejection roller pair 17 has ejected an original sheet M from which an image has been read to the front cover 19, the next original sheet M reaches a reading site of the reader 20. Consequently, when subsequently transporting original sheets M, the scanner 1 suppresses one of the original sheets M from riding on another, thereby successfully reducing the risk of failures to transport the original sheets M and to read images from the original sheets M.

When the transport roller pair 16 sequentially transports a series of original sheets M, the controller 50 may continue to perform the strong deceleration control on the original sheets M once employing the strong deceleration control, in accordance with the flowchart of FIG. 8. Performing the ejection process in this manner enables the controller 50 to perform simple control at a light load.

When the transport roller pair 16 sequentially transports a series of original sheets M, once the controller 50 employs the strong deceleration control, the controller 50 may determine whether individual lengths of the original sheets M in the transport direction are equal to or more than the threshold. When a length of an original sheet M in the transport direction is equal to or more than the threshold, the controller 50 may perform the weak deceleration control on this original sheet M. When a length of an original sheet M in the transport direction is less than the threshold, the controller 50 may perform the strong deceleration control on this original sheet M. When performing the ejection process, the scanner 1 performs the strong deceleration control only on original sheets M lengths of which are less than the threshold because those original sheets M tend to be stacked randomly. This successfully suppresses the ejection roller pair 17 from ejecting the original sheets M at a decreased speed, namely, the reader 20 from reading the original sheets M in an increased time.

Next, the ejection process related to the above controls will be described below with reference to a flowchart of FIG. 10. In this flowchart, the steps identical to those in the flowchart of FIG. 8 are given the same step numbers and will not be described in detail.

In the ejection process according to the flowchart of FIG. 10, when the controller 50 selects "Yes" at Step S150, the process proceeds to Step S190. Then, at Step S190, the controller 50 determines whether the length of an original sheet M from which an image is being read by the reader 20 is equal to or more than the threshold. When the controller 50 determines whether the length of the original sheet M is less than the threshold (No at S190), the process proceeds to Step S200. When the controller 50 determines whether the length of the original sheet M is equal to or more than the threshold (Yes at S190), the process proceeds to Step S220. In the ejection process according to the flowchart of FIG. 10, the controller 50 enters neither the strong deceleration monitor ON state nor the strong deceleration monitor OFF state and determines whether the length of each original sheet M from which an image is being read by the reader 20 is equal to or more than the threshold.

It should be noted that the present disclosure is not limited to the foregoing embodiment: therefore, the embodiment may be modified in various ways within the scopes of the claims, and those modified embodiments obviously fall within the scopes. In the embodiment, the medium feeder 9 is applied to a scanner; however, the medium feeder 9 may be applied to a recording apparatus with a recording head, such as a printer, that records information on a record sheet and other media. Furthermore, when a length of a first one of a series of original sheets M is less than the threshold, the scanner 1 may eject this first original sheet M at the third speed instead of the second speed.

What is claimed is:

1. An image reading apparatus configured to sequentially read images from a plurality of media having different lengths in a transport direction, the image reading apparatus comprising:
    a transport section that transports the media at a first speed along a transport route, the transport section being driven by a driver;
    a reader that reads the images from the media being transported at the first speed along the transport route;
    an ejection section that ejects the media from which the images were read by the reader to an ejection stacker, the ejection section being driven by the driver;
    a medium detector that detects presence of the media; and
    a controller that controls the driver, wherein
    when the transport section sequentially transports the media, the controller determines the lengths of the media in the transport direction, based on detection results of the medium detector,
    when determining that a length of a medium is equal to or more than a threshold and then determining that a length of a subsequent medium is equal to or more than the threshold, the controller performs weak deceleration control under which the transport section changes an ejection speed at which the subsequent medium is ejected to the ejection stacker from the first speed to a second speed, the second speed being lower than the first speed, and
    when determining that a length of a medium is equal to or more than the threshold and then determining that a length of a subsequent medium is less than the threshold, the controller performs strong deceleration control under which the transport section changes the ejection speed at which the subsequent medium is ejected to the ejection stacker from the first speed to a third speed, the third speed being lower than the second speed.

2. The image reading apparatus according to claim 1, wherein
    the threshold is set to a distance, in an ejection direction, between a point at which the ejection section ejects the media and a point at which the media make contact with the ejection stacker upon ejection.

3. The image reading apparatus according to claim 1, wherein
    the image reading apparatus supports a low-speed transport mode in which the transport section transports the media at a fourth speed, the fourth speed being lower than the first speed, and in which the reader reads the images from the media being transported at the fourth speed along the transport route, and
    when the low-speed transport mode is selected, the controller controls the driver in such a way that the ejection section ejects the media to the ejection stacker at the fourth speed.

4. The image reading apparatus according to claim 1, wherein
when the transport section sequentially transports a series of media, once the controller employs the strong deceleration control, the controller continues to perform the strong deceleration control on the media.

5. The image reading apparatus according to claim 4, wherein
when the transport section subsequently transports a series of media and then further subsequently transports another series of media, the controller determines whether to switch between the weak deceleration control and the strong deceleration control every time each of the series of media is transported.

6. The image reading apparatus according to claim 1, wherein
when the transport section sequentially transports a series of media, once the controller employs the strong deceleration control, the controller determines whether individual lengths of the media in the transport direction are equal to or more than the threshold,
when a length of a medium in the transport direction is equal to or more than the threshold, the controller performs the weak deceleration control on the medium, and
when the length of the medium in the transport direction is less than the threshold, the controller performs the strong deceleration control on the medium.

7. The image reading apparatus according to claim 1, wherein
the transport section is configured to transport a plurality of transparent cases containing the respective media, and
the medium detector is a transparent-case detector that detects the lengths of the media in the transport direction, based on locations of the transparent cases transported.

8. The image reading apparatus according to claim 1, wherein
the medium detector is a medium-edge detector that detects locations of edges, in the transport direction, of the media transported along the transport route.

9. The image reading apparatus according to claim 1, wherein
the lengths of media in the transport direction are determined in consideration of a fact that the lengths of media increase when the media are diagonally transported.

10. The image reading apparatus according to claim 1, further comprising a feeder that feeds the media along the transport route, wherein
the controller controls the feeder in such a way that, after the ejection section ejects a medium from which an image was read by the reader to the ejection stacker, a next medium reaches a reading site of the reader.

* * * * *